(12) United States Patent
Denecheau et al.

(10) Patent No.: US 7,983,163 B2
(45) Date of Patent: Jul. 19, 2011

(54) SYSTEM AND METHOD FOR IMPLEMENTING ADAPTIVE LOAD SHARING TO BALANCE NETWORK TRAFFIC

(75) Inventors: Lionel Denecheau, La Colle sur Loup (FR); Ludovic Hazard, Tourrettes sur Loup (FR); M. Stephen Sauer, Tourny (FR)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/342,257

(22) Filed: Dec. 23, 2008

(65) Prior Publication Data

US 2010/0149979 A1 Jun. 17, 2010

(30) Foreign Application Priority Data

Dec. 11, 2008 (EP) .................................. 08305922

(51) Int. Cl.
*H04L 12/26* (2006.01)
(52) U.S. Cl. ........................................................ 370/232
(58) Field of Classification Search .................. 370/234, 370/232
See application file for complete search history.

(56) References Cited

U.S. PATENT DOCUMENTS

| | | | |
|---|---|---|---|
| 6,976,087 B1 * | 12/2005 | Westfall et al. ............... | 709/238 |
| 7,035,938 B2 * | 4/2006 | Lau ................................ | 709/241 |
| 7,136,357 B2 | 11/2006 | Soumiya et al. | |
| 7,336,613 B2 | 2/2008 | Lloyd et al. | |
| 2003/0058797 A1 * | 3/2003 | Izmailov et al. ............... | 370/238 |
| 2006/0088063 A1 * | 4/2006 | Hartung et al. ............... | 370/498 |
| 2006/0133300 A1 | 6/2006 | Lee et al. | |
| 2007/0133433 A1 | 6/2007 | Nam et al. | |
| 2008/0008178 A1 * | 1/2008 | Tychon et al. ................. | 370/392 |
| 2008/0031146 A1 | 2/2008 | Kwak et al. | |
| 2008/0089347 A1 * | 4/2008 | Phillipi et al. ................. | 370/400 |
| 2008/0114892 A1 * | 5/2008 | Bruno et al. ................... | 709/234 |
| 2009/0028141 A1 * | 1/2009 | Vu Duong et al. ............. | 370/389 |
| 2009/0207731 A1 * | 8/2009 | Carlson et al. ................ | 370/232 |
| 2010/0142366 A1 * | 6/2010 | Bugenhagen .................. | 370/216 |
| 2010/0177634 A1 * | 7/2010 | Kiss et al. ...................... | 370/230 |

FOREIGN PATENT DOCUMENTS

WO WO03058868 A2 7/2003

OTHER PUBLICATIONS

U.S. Appl. No. 12/872,021, filed Aug. 31, 2010; Confirmation No. 2787.

* cited by examiner

*Primary Examiner* — Derrick W Ferris
*Assistant Examiner* — Christopher R Crompton
(74) *Attorney, Agent, or Firm* — Schmeiser, Olsen & Watts; John Pivnichny

(57) ABSTRACT

A method for implementing adaptive load sharing to balance network traffic. The method begins by identifying all paths in a network between a first provider edge and a second provider edge. Next determining jitter, packet delay, and packet loss for each identified path in the network. Then utilizing the jitter, packet delay, and packet loss values, calculating a usage value for each path in the network. The usage value corresponds to the percentage of all network traffic which a specific path in the network may manage. When data is received by the first provider edge, the provider edge selects the appropriate path for the data. The appropriate path being the path with the largest usage value which is currently not managing a percentage of the network traffic that is equal to its usage value.

16 Claims, 3 Drawing Sheets

SYSTEM AND METHOD FOR IMPLEMENTING ADAPTIVE LOAD SHARING TO BALANCE NETWORK TRAFFIC

BACKGROUND OF THE INVENTION

The present invention relates generally to network load balancing and more particularly to implementing adaptive load sharing to balance network traffic.

Servers supporting mission-critical applications (i.e. financial transactions, database access, corporate intranets, etc.) must exchange traffic across data networks. Moreover, Additional time sensitive applications (i.e. Voice over IP, Video) need to be carried across networks. Additionally, networks need the ability to scale performance to handle large numbers of end user requests without creating unwanted delays.

Network load balancing distributes traffic to multiple paths inside the network, each path going across different network equipments (routers). Network load balancing transparently partitions the end user requests among the network paths.

Conventionally, the network routing protocols send traffic according to the shortest path between the end user and the application. Usually, the shortest path is determined based on static criteria such as least number of intermediate devices in the path (less hops), or larger capacity links (in terms of bandwidth). As the number of end users utilizing an application increases, the shortest path becomes congested leading to delays, jitters, and eventually packet loss, while they may exist alternate paths (less preferred) which are not congested.

SUMMARY OF THE INVENTION

The present invention provides a method for implementing adaptive load sharing to balance network traffic, said method comprising: identifying paths $P_i$ across said network for i=1, 2, ..., I, each path $P_i$ beginning at a first provider edge and ending at a second provider edge, both said first provider edge and said second provider edge residing in a network, said index I being a total number of paths in said network and being a positive integer greater than 1;

identifying jitter $J_i$ for i=1, 2, ..., I where $J_i$ corresponds to jitter on path $P_i$, said jitter Ji being a measurement of time;

identifying packet delay $D_i$ for i=1, 2, ..., I where $D_i$ is a packet delay on path $P_i$, said packet delay Di being a measurement of time;

identifying packet loss $L_i$ for i=1, 2, ..., I where $L_i$ is a packet loss on path $P_i$, said packet loss Li being an integer having a value greater than zero;

calculating path usage $U_i$ for i=1, 2, ..., I where $U_i$ is a maximum percentage of network traffic path $P_i$ may transmit, said $U_i$ being a function of said $J_i$ and said $D_i$ and said $L_i$; and sending data received by said first provider edge to said second provider edge via path $P_i$ where path $P_i$ has both a largest path usage $U_i$ value selected from $U_1, U_2, ..., U_I$ and said path $P_i$ does not already transmit a percentage of network traffic equal to said $U_i$.

DETAILED DESCRIPTION OF THE DRAWINGS

Definitions

The term 'provider edge' as used herein refers to a network hardware device situated between one network service provider's area and areas administered by other network providers.

The term 'jitter' as used herein refers to unwanted variation of one or more characteristics of a periodic signal in electronics and telecommunications. Jitter may be seen in characteristics such as the interval between successive pulses, or the amplitude, frequency, or phase of successive cycles.

The term 'packet loss' as used herein refers to the situation where one or more packets of data traveling across a computer network fail to reach their destination. Packet loss can be caused by a number of factors, including signal degradation over the network medium, oversaturated network links, corrupted packets rejected in-transit, faulty networking hardware, maligned system drivers or network applications, or normal routing routines.

The term 'packet delay' and/or 'latency' as used herein refers to the period of time necessary for a packet of data to travel from one designated point to another. One-way Latency is measured by sending a packet of data across the network and by comparing the time the packet was sent with the time the packet was received, assuming both sending and receiving devices have their clock synchronized using a Network Time Protocol.

SPECIFICATION

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
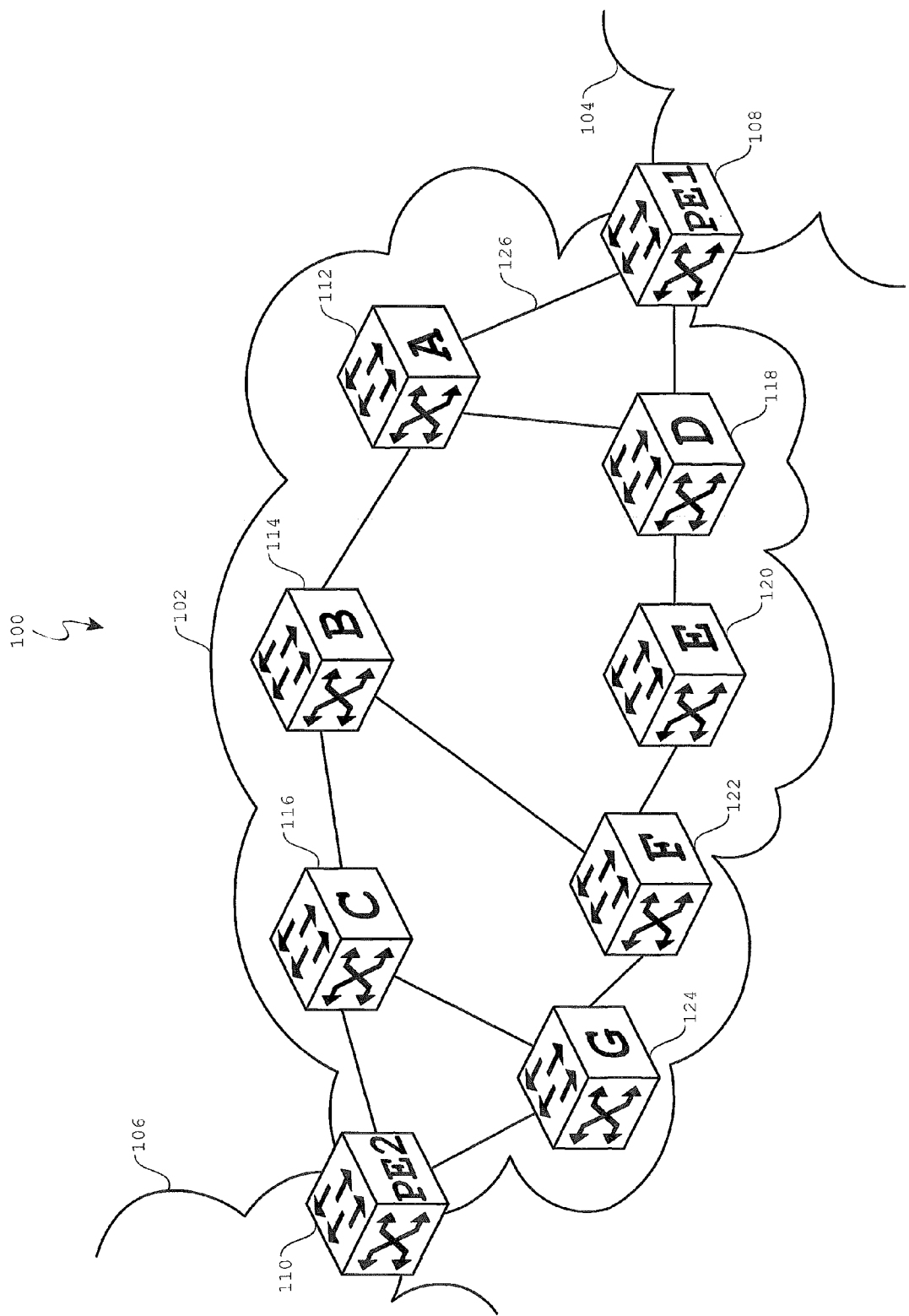
FIG. 1 illustrates an environment in which a method for implementing adaptive load sharing to balance network traffic may be implemented, in accordance with embodiments of the present invention.

FIG. 1 illustrates an environment 100 in which a method for implementing adaptive load sharing to balance network traffic may be implemented, in accordance with embodiments of the present invention.

The environment 100 comprises a first network 102 connected to both a second network 104 and a third network 106. The first network 102 comprises a first provider edge (PE1) 108 connecting the first network 102 with the second network 104. The first network 102 also comprises a second provider edge (PE2) 110 connecting the first network 102 with the third network 106. It is understood that while FIG. 1 illustrates the first network 102 comprises two provider edges (PE1 108 and PE2 110), the first network 102 may comprise a number of provider edges ranging from one to infinity.

Moreover, the first network 102 comprises a plurality of network hardware devices 112 through 124 interconnected via transmission paths 126, the transmission paths being, inter alia, Ethernet cables, fiber optic cables, radio-wave signals, satellite signals, etc.

Between the first provider edge 108 and the second provider edge 110, there are a plurality of paths upon which information may be sent. For example, with respect to FIG. 1, one path from PE1 108 to PE2 110 may travel along devices A 112, B 114, and C 116. An alternative path from PE1 108 to PE2 110 may be through devices D 118, E 120, F 122, and G 124. A second alternative path from PE1 108 to PE2 110 may be through devices D 118, A 112, B 114, F 122, G 124, and C 116.

Each path from PE1 108 to PE2 110 will have its own values for jitter, packet loss, and packet delay. While conventional network load sharing simply look to the shortest path (i.e. least amount of hardware) between PE1 108 and PE2 110, as this 'shortest' path receives all the traffic, this 'shortest path' may experience jitter, packet loss, and packet delay.

Figure 2:
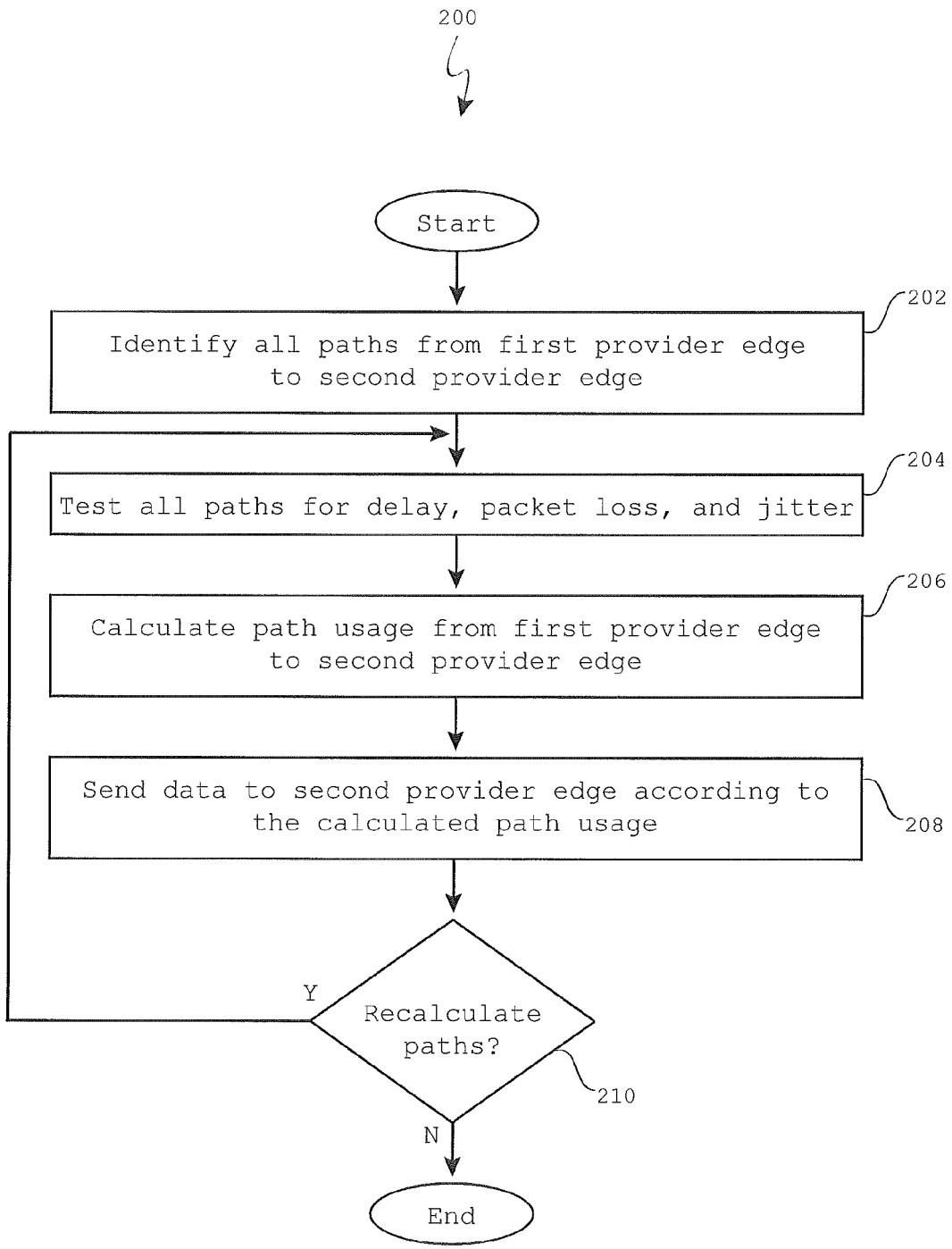
FIG. 2 illustrates a method for implementing adaptive load sharing to balance network traffic, in accordance with embodiments of the present invention.

FIG. 2 illustrates a method 200 for implementing adaptive load sharing to balance network traffic, in accordance with embodiments of the present invention.

The method 200 begins with step 202 which comprises identifying all paths from the first provider edge PE1 108 to the second provider edge PE2 110 (see FIG. 1, supra). In one embodiment of the present invention each path is represented as $P_i$ indexed from i=1 to i=I, where I is a positive number greater than 1 and equal to the total number of paths from the first provider edge PE1 108 to the second provider edge PE2 110. Once each path from the first provider edge PE1 108 to the second provider edge PE2 110 are identified, the first provider edge PE1 108 stores $P_i$ for i=1, 2, . . . , I in a library residing within the first provider edge PE1 108.

After completion of step 202, the method 200 continues with step 204 which comprises testing each path $P_i$ for packet delay, packet loss, and jitter. In one embodiment of the present invention, the first provider edge PE1 108 sends artificial data through the first network 102 to the second provider edge PE2 110 according to each $P_i$ for i=1, 2, . . . , I. For each $P_i$, the first provider edge PE1 108 records the packet delay $D_i$ in terms of milliseconds; the jitter $J_i$ in terms of milliseconds; and the packet loss $L_i$ in terms of losses per ten million (10 mm). Thereinafter, the first provider edge PE1 108 stores $D_i$, $J_i$, and $L_i$ in the library.

After completion of step 204, the method 200 continues with step 206 which comprises calculating path usage from the first provider edge PE1 108 to the second provider edge PE2 110.

In one embodiment of the present invention, prior to step 204 an end user provides the first provider edge PE1 108 with three variables: a delay ratio (DN); a jitter ratio (JN); and a loss ratio (LN). In an alternative embodiment of the present invention, the variables DN, JN, and LN are stored in the first provider edge PE1 108 prior to the start of the method 200. However, regardless of the embodiment of the present invention, all three variables DN, JN, and LN are integers having a value between zero (0) and one thousand twenty four (1024).

In one embodiment of the present invention, step 206 first calculates an intermediate value called the path rate $R_i$ for i=1, 2, . . . , I. The path rate $R_i$ is calculated utilizing $D_i$, $J_i$, and $L_i$ as well as DN, JN, and LN. Specifically, $R_i$ is calculated according to the function $R_i = D_i*DN + J_i*JN + L_g*LN$ for i=1, 2, . . . , I. After calculating $R_i$ for i=1, 2, . . . , I, step 206 calculates the weight per path $W_i$ for i=1, 2, . . . , I.

The weight per path $W_i$ is calculated according to the function $$W_i = \frac{R_i}{\sum_{i=2}^{I} R_i}$$

for i=1, 2, . . . , I. After calculating the weight per path $W_i$, step 206 calculates the credit per path $C_i$ for i=1, 2, . . . , I. The credit per path $C_i$ is calculated according to the function $$C_i = \frac{1}{w_i}.$$

Finally after calculating the credit per path $C_i$, step 206 calculates the path usage Ui for i=1, 2, . . . , I.

The path usage $U_i$ utilizes the path rate $R_i$, weight per path $W_i$, and credit per path $C_i$ and the resulting value derived will be used by the first provider edge PE1 108 to apportion the amount of traffic each path $P_i$ can reasonably manage.

In one embodiment of the present invention path usage $U_i$ is calculated according to the function $$U_i = \frac{c_i}{\sum_{i=2}^{I} c_i}$$

for i=1, 2, . . . , I. The resulting path usage $U_i$ is a fraction representing the percentage of total network traffic which a give path $P_i$ can manage. After path usage $U_i$ is calculated for i=1, 2, . . . , I, step 206 stores the path usage $U_i$ results in a library managed by the first provider edge PE1 108.

After completion of step 206, the method 200 continues with step 208 which comprises sending data to the second provider edge PE2 110 according to the calculated path usage $U_i$ values. In one embodiment of the present invention, when receiving data originating from the second network 104, the first provider edge PE1 108 will look to the path usage values $U_i$ for i=1, 2, . . . , I for the most appropriate path $P_i$ to transmit the data across. As noted supra, the path usage values $U_i$ represent the percentage of the network traffic a specific path $P_i$ can handle/manage effectively.

In one embodiment of the present invention, step 208 identifies the path usage value $U_i$ having the largest value not exceeding the current network traffic. For example, say only three paths exist in the first network 102 (see FIG. 1, supra) $P_1$, $P_2$ and $P_3$ each having a calculated path usage value of $U_1$=0.30, $U_2$=0.20, and $U_3$=0.50. Since based on path usage values $P_3$ can handle/manage more network traffic than $P_1$ and $P_2$, step 208 would attempt to send the recently received data to the second provider edge PE2 110 via path $P_3$. Step 208 would also determine if sending the recently received data across the first network 102 via path $P_3$ would translate into $P_3$ managing more than 50% of the overall network traffic (the maximum value $P_3$ may handle based on $U_3$). If $P_3$ would end up managing more than 50% of the network traffic as a result of routing the received data, step 208 identifies the next largest path usage value after $U_3$. Since $U_1$=0.30 is greater than $U_2$=0.20, step 208 would transmit the received data to the second provider edge PE2 110 via path $P_1$.

In one embodiment of the present invention, step 208 is completed after a period of time established by the end user. In an alternative embodiment of the present invention, step 208 is completed after a pre-defined period of time, the period not being established by the end user. In another alternative embodiment of the present invention, step 208 is completed after a specific number of paths have been exhausted, the specific number being provided by the end user After completion of step 208, the method 200 continues with step 210 which comprises determining whether to recalculate all network paths. In one embodiment of the present invention, step 210 identifies whether data is received by the first provider edge PE1 108 requiring transmission to the second provider edge PE2 110. If the first provider edge PE2 108 continues to receive data, step 210 returns a response of 'yes' and the method 200 returns to step 204 to perform steps 204 through 210 again. However, if the first provider edge PE2 108 does not continue to receive data, step 210 returns a response of 'no' and the method 200 ends.

In an alternative embodiment of the present invention, step 210 identifies whether data is currently being transmitted across the first network 102. If data is actively/currently being transmitted across the first network 102, step 210 returns a response of 'yes' and the method 200 returns to step 204 to perform steps 204 through 210 again. However, if no data is actively/currently being transmitted across the first network 102, step 210 returns a response of 'no' and the method 200 ends.

In one embodiment of the present invention, the method 200 is applied specifically to a multiprotocol label switching network, or MPLS. The MPLS network comprises provider edges (PEs) as well as provider routers (Ps). Furthermore the MPLS comprises, inter alia, a control plane and a data plane.

The control plane in turn comprises routing protocols (i.e. label discovery protocol or LDP; interior gateway protocol or IGP, etc.); a label information base (LIB) which contains label switched paths (LSPs); and a generic internet protocol service level agreement (IP SLA) engine to measure latency, jitter, and packet loss across the LSP.

The data plane utilizes the result of the control plane's calculations and IP SLA measurements to load balance traffic from the incoming provider edge (PE) to the outgoing provider edge (PE) across the multiple LSP.

Figure 3:
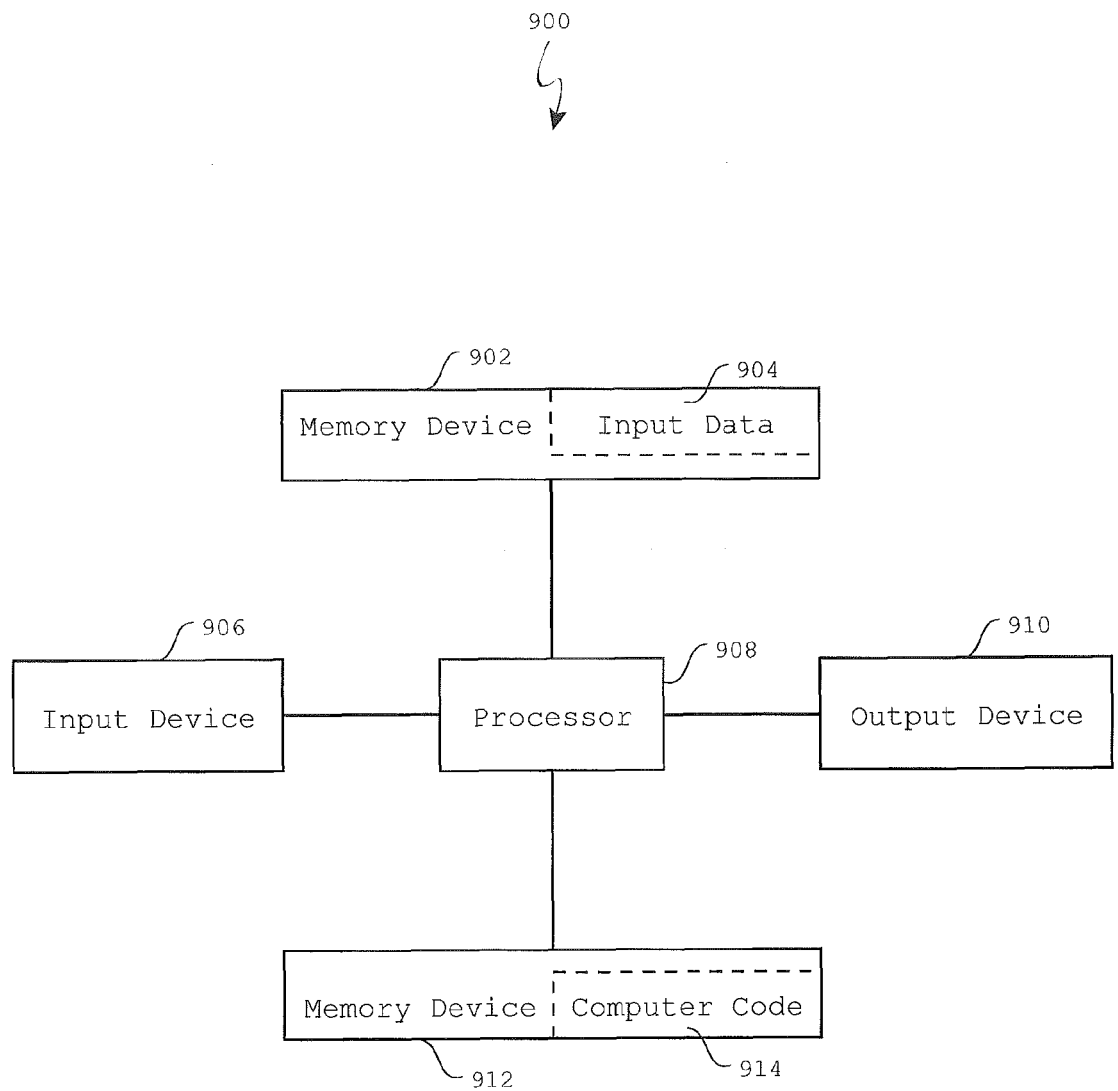
FIG. 3 illustrates a computer system which may facilitate a method for implementing adaptive load sharing to balance network traffic, in accordance with embodiments of the present invention.

FIG. 3 illustrates a computer system 900 which may facilitate a method for implementing adaptive load sharing to balance network traffic, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for implementing adaptive load sharing to balance network traffic according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 3) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for implementing adaptive load sharing to balance network traffic. Thus, the present invention discloses a process for supporting computer infrastructure, comprising integrating, hosting, maintaining and deploying computer-readable code into a computing system (e.g., computing system 900), wherein the code in combination with the computing system is capable of performing a method for implementing adaptive load sharing to balance network traffic.

In another embodiment, the invention provides a business method that performs the process steps of the invention on a subscription, advertising and/or fee basis. That is, a service provider, such as a Solution Integrator, can offer to create, maintain, support, etc. a process for implementing adaptive load sharing to balance network traffic. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 3 shows the computer system 900 as a particular configuration of hardware and software, any configuration of hardware and software, as would be known to a person of ordinary skill in the art, may be utilized for the purposes stated supra in conjunction with the particular computer system 900 of FIG. 3. For example, the memory devices 902 and 912 may be portions of a single memory device rather than separate memory devices. In addition, in one embodiment of the present invention the computer system 900 may resemble a network router (i.e. provider edge router) and facilitate a method for implementing adaptive load sharing to balance network traffic.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for implementing adaptive load sharing to balance network traffic, said method comprising:

identifying paths $P_i$ for i=1, 2, ..., I, each path $P_i$ beginning at a first provider edge and ending at a second provider edge, both said first provider edge and said second provider edge residing in a network, said index I being a total number of paths in said network and being a positive integer greater than 1;

identifying jitter $J_i$ for i=1, 2, ..., I where $J_i$ corresponds to jitter on path $P_i$, said jitter Ji being a measurement of time;

identifying packet delay $D_i$ for i=1, 2, ..., I where $D_i$ is a packet delay on path $P_i$, said packet delay Di being a measurement of time;

identifying packet loss $L_i$ for i=1, 2, ..., I where $L_i$ is a packet loss on path $P_i$, said packet loss Li being an integer having a value greater than zero;

a processor of a computer system calculating path usage $U_i$ for i=1, 2, ..., I where $U_i$ is a maximum percentage of network traffic path $P_i$ may transmit, said $U_i$ being a function of said $J_i$ and said $D_i$ and said $L_i$; and sending data received by said first provider edge to said second provider edge via path $P_i$ where path $P_i$ has both a largest path usage $U_i$ value selected from $U_1, U_2, \ldots, U_1$ and said path $P_i$ does not already transmit a percentage of network traffic equal to said $U_i$, said calculating said path usage $U_i$ comprising:

calculating a path rate $R_i$ according to a function $R_i = D_i * DN + J_i * JN + L_i - LN$ for i=1, 2, ..., I, said DN being a delay ratio and being an integer having a value greater than 1, said JN being a jitter ratio and being an integer having a value greater than 1, said LN being a packet loss ratio per ten million packets and being an integer having a value greater than 1, said DN and said JN and said LN being provided by an end user prior to said calculating said path usage $U_i$, and calculating said path usage $U_i$ according to a function $$U_i = \frac{c_i}{\sum_{i=2}^{I} c_i}$$

for i=1, 2, ..., I, where $C_i$ is value calculated according to a function $$C_i = \frac{1}{\frac{R_i}{\sum_{i=2}^{I} R_i}}.$$

2. The method of claim 1, said method further comprising: repeating said identifying said packet delay $D_i$ for i=1, 2, ..., I and said identifying said jitter $J_i$ for i=1, 2, ..., I and said identifying said packet loss $L_i$ for i=1, 2, ..., I and said calculating said path usage $U_i$ for i=1, 2, ..., I, after a period of time having elapsed.

3. The method of claim 1, said identifying paths $P_i$ further comprising:
storing in a repository located on said first provider edge said identified paths $P_i$ for i=1, 2, ..., I.

4. The method of claim 1, said method further comprising: storing in a repository said jitter $J_i$ for i=1, 2, ..., I and said packet delay $D_i$ for i=1, 2, ..., I and said packet loss $L_i$ for i=1, 2, ..., I and said path usage $U_i$ for i=1, 2, ..., I.

5. A computer program product, comprising a computer readable physically tangible storage device having a computer-readable program code stored therein, said computer-readable program code containing instructions that when executed by a processor of a computer system implement a method for implementing adaptive load sharing to balance network traffic, said method comprising:

identifying paths $P_i$ for i=1, 2, ..., I, each path $P_i$ beginning at a first provider edge and ending at a second provider edge, both said first provider edge and said second provider edge residing in a network, said index I being a total number of paths in said network and being a positive integer greater than 1;

identifying jitter $J_i$ for i=1, 2, ..., I where $J_i$ corresponds to jitter on path $P_i$, said jitter Ji being a measurement of time;

identifying packet delay $D_i$ for i=1, 2, ..., I where $D_i$ is a packet delay on path $P_i$, said packet delay Di being a measurement of time;

identifying packet loss $L_i$ for i=1, 2, ..., I where $L_i$ is a packet loss on path $P_i$, said packet loss Li being an integer having a value greater than zero;

calculating path usage $U_i$ for i=1, 2, ..., I where $U_i$ is a maximum percentage of network traffic path $P_i$ may transmit, said $U_i$ being a function of said $J_i$ and said $D_i$ and said $L_i$; and sending data received by said first provider edge to said second provider edge via path $P_i$ where path $P_i$ has both a largest path usage $U_i$ value selected from $U_1, U_2, \ldots, U_1$ and said path $P_i$ does not already transmit a percentage of network traffic equal to said $U_i$, said calculating said path usage $U_i$ comprising:

calculating a path rate $R_i$ according to a function $R_i = D_i * DN + J_i * JN + L_i * LN$ for i=1, 2, ..., I, said DN being a delay ratio and being an integer having a value greater than 1, said JN being a jitter ratio and being an integer having a value greater than 1, said LN being a packet loss ratio per ten million packets and being an integer having a value greater than 1, said DN and said JN and said LN being provided by an end user prior to said calculating said path usage $U_i$, and calculating said path usage $U_i$ according to a function $$U_i = \frac{c_i}{\sum_{i=1}^{I} c_i}$$

for i=1, 2, ..., I, where $C_i$ is value calculated according to a function $$C_i = \frac{1}{\frac{R_i}{\sum_{i=2}^{I} R_i}}.$$

6. The computer program product of claim 5, said method further comprising:
repeating said identifying said packet delay $D_i$ for i=1, 2, ..., I and said identifying said jitter $J_i$ for i=1, 2, ..., I and said identifying said packet loss $L_i$ for i=1, 2, ..., I and said calculating said path usage $U_i$ for i=1, 2, ..., I, after a period of time having elapsed.

7. The computer program product of claim 5, said identifying paths $P_i$ further comprising:
storing in a repository located on said first provider edge said identified paths $P_i$ for i=1, 2, ..., I.

8. The computer program product of claim 5, said method further comprising:
storing in a repository said jitter $J_i$ for i=1, 2, ..., I and said packet delay $D_i$ for i=1, 2, ..., I and said packet loss $L_i$ for i=1, 2, ..., I and said path usage $U_i$ for i=1, 2, ..., I.

9. A computing system comprising a processor coupled to a computer-readable memory unit, said memory unit comprising a software application, said software application comprising instruction that when executed by said processor, implement a method for implementing adaptive load sharing to balance network traffic, said method comprising:

identifying paths $P_i$ for i=1, 2, ..., I, each path $P_i$ beginning at a first provider edge and ending at a second provider edge, both said first provider edge and said second provider edge residing in a network, said index I being a total number of paths in said network and being a positive integer greater than 1;

identifying jitter $J_i$ for i=1, 2, ..., I where $J_i$ corresponds to jitter on path $P_i$, said jitter Ji being a measurement of time;

identifying packet delay $D_i$ for i=1, 2, ..., I where $D_i$ is a packet delay on path $P_i$ said packet delay Di being a measurement of time;

identifying packet loss $L_i$ for i=1, 2, ..., I where $L_i$ is a packet loss on path $P_i$, said packet loss Li being an integer having a value greater than zero;

calculating path usage $U_i$ for i=1, 2, ..., I where $U_i$ is a maximum percentage of network traffic path $P_i$ may transmit, said $U_i$ being a function of said $J_i$ and said $D_i$ and said $L_i$; and sending data received by said first provider edge to said second provider edge via path $P_i$ where path $P_i$ has both a largest path usage $U_i$ value selected from $U_1, U_2, ..., U_1$ and said path $P_i$ does not already transmit a percentage of network traffic equal to said $U_i$, said calculating said path usage $U_i$ comprising:

calculating a path rate $R_i$ according to a function $R_i = D_i*DN+J_i*JN+L_i*LN$ for i=1, 2, ... I, said DN being a delay ratio and being an integer having a value greater than 1, said JN being a jitter ratio and being an integer having a value greater than 1, said LN being a packet loss ratio per ten million packets and being an integer having a value greater than 1, said DN and said JN and said LN being provided by an end user prior to said calculating said path usage $U_i$, and calculating said path usage $U_i$ according to a function $$U_i = \frac{c_i}{\sum_{i=1}^{I} c_i}$$

for i=1, 2, ..., I, where $C_i$ is value calculated according to a function $$C_i = \frac{1}{\frac{R_i}{\sum_{i=2}^{I} R_i}}.$$

10. The computing system of claim 9, said method further comprising:

repeating said identifying said packet delay $D_i$ for i=1, 2, ..., I and said identifying said jitter $J_i$ for i=1, 2, ..., I and said identifying said packet loss $L_i$ for i=1, 2, ..., I and said calculating said path usage $U_i$ for i=1, 2, ..., I, after a period of time having elapsed.

11. The computing system of claim 9, said identifying paths $P_i$ further comprising:

storing in a repository located on said first provider edge said identified paths $P_i$ for i=1, 2, ..., I.

12. The computing system of claim 9, said method further comprising:

storing in a repository said jitter $J_i$ for i=1, 2, ..., I and said packet delay $D_i$ for i=1, 2, ..., I and said packet loss $L_i$ for i=1, 2, ..., I and said path usage $U_i$ for i=1, 2, ..., I.

13. A process for supporting computer infrastructure, said process comprising providing at least one support service for at least one of creating, integrating, hosting, maintaining, and deploying computer-readable code in a computing system, wherein said code in combination with the computing system is capable of implementing a method for implementing adaptive load sharing to balance network traffic, said method comprising:

identifying paths $P_i$ for i=1, 2, ..., I, each path $P_i$ beginning at a first provider edge and ending at a second provider edge, both said first provider edge and said second provider edge residing in a network, said index I being a total number of paths in said network and being a positive integer greater than 1;

identifying jitter $J_i$ for i=1, 2, ..., I where $J_i$ corresponds to jitter on path $P_i$, said jitter Ji being a measurement of time;

identifying packet delay $D_i$ for i=1, 2, ..., I where $D_i$ is a packet delay on path $P_i$ said packet delay Di being a measurement of time;

identifying packet loss $L_i$ for i=1, 2, ..., I where $L_i$ is a packet loss on path $P_i$, said packet loss Li being an integer having a value greater than zero;

a processor of a computer system calculating path usage $U_i$ for i=1, 2, ..., I where $U_i$ is a maximum percentage of network traffic path $P_i$ may transmit, said $U_i$ being a function of said $J_i$ and said $D_i$ and said $L_i$; and sending data received by said first provider edge to said second provider edge via path $P_i$ where path $P_i$ has both a largest path usage $U_i$ value selected from $U_1, U_2, ..., U_1$ and said path $P_i$ does not already transmit a percentage of network traffic equal to said $U_i$, said calculating said path usage $U_i$ comprising:

calculating a path rate $R_i$ according to a function $R_i = D_i*DN+J_i*JN+L_i*LN$ for i=1, 2, ..., I, said DN being a delay ratio and being an integer having a value greater than 1, said JN being a jitter ratio and being an integer having a value greater than 1, said LN being a packet loss ratio per ten million packets and being an integer having a value greater than 1, said DN and said JN and said LN being provided by an end user nor to said calculating said path usage $U_i$, and calculating said path usage $U_i$ according to a function $$U_i = \frac{c_i}{\sum_{i=2}^{I} c_i}$$

for i=1, 2, ..., I, where $C_i$ is value calculated according to a function $$C_i = \frac{1}{\frac{R_i}{\sum_{i=2}^{I} R_i}}.$$

14. The process for supporting computer infrastructure of claim 13, said method further comprising:

repeating said identifying said packet delay $D_i$ for i=1, 2, ..., I and said identifying said jitter $J_i$ for i=1, 2, ..., I and said identifying said packet loss $L_i$ for i=1, 2, ..., I and said calculating said path usage $U_i$ for i=1, 2, ..., I, after a period of time having elapsed.

15. The process for supporting computer infrastructure of claim 13, said identifying paths $P_i$ further comprising:

storing in a repository located on said first provider edge said identified paths $P_i$ for i=1, 2, ..., I.

16. The process for supporting computer infrastructure of claim 13, said method further comprising:

storing in a repository said jitter $J_i$ for i=1, 2, ..., I and said packet delay $D_i$ for i=1, 2, ..., I and said packet loss $L_i$ for i=1, 2, ..., I and said path usage $U_i$ for i=1, 2, ..., I.

* * * * *